(12) United States Patent
Izawa

(10) Patent No.: US 8,852,053 B2
(45) Date of Patent: Oct. 7, 2014

(54) POWER GENERATION CONTROL DEVICE FOR ELECTRIC VEHICLE

(75) Inventor: Kazuyuki Izawa, Hamamatsu (JP)

(73) Assignee: Suzuki Motor Corporation, Shizuoka (JP)

( * ) Notice: Subject to any disclaimer, the term of this patent is extended or adjusted under 35 U.S.C. 154(b) by 0 days.

(21) Appl. No.: 13/824,584

(22) PCT Filed: Jun. 14, 2011

(86) PCT No.: PCT/JP2011/063612
§ 371 (c)(1),
(2), (4) Date: Mar. 18, 2013

(87) PCT Pub. No.: WO2012/039167
PCT Pub. Date: Mar. 29, 2012

(65) Prior Publication Data
US 2013/0190132 A1 Jul. 25, 2013

(30) Foreign Application Priority Data

Sep. 21, 2010 (JP) ................................ 2010-210969

(51) Int. Cl.
| | |
|---|---|
| *B60K 1/02* | (2006.01) |
| *B60W 20/00* | (2006.01) |
| *B60K 6/46* | (2007.10) |
| *B60W 10/26* | (2006.01) |
| *B60L 11/12* | (2006.01) |
| *B60L 11/18* | (2006.01) |
| *B60W 10/08* | (2006.01) |
| *B60W 10/06* | (2006.01) |

(52) U.S. Cl.
CPC ............ *B60W 20/106* (2013.01); *Y02T 10/7044* (2013.01); *Y02T 10/6286* (2013.01); *B60K 6/46* (2013.01); *Y02T 10/7005* (2013.01); *B60W 10/26* (2013.01); *B60L 11/123* (2013.01); *Y02T 10/6217* (2013.01); *Y02T 10/7077* (2013.01); *B60W 2710/244* (2013.01); *Y02T 10/705* (2013.01); *B60L 11/1862* (2013.01); *B60W 10/08* (2013.01); *Y10S 903/93* (2013.01); *B60W 10/06* (2013.01)
USPC ............................................... 477/3; 903/930

(58) Field of Classification Search
USPC .......... 477/3, 7, 101, 107; 903/903, 930, 940; 180/65.225
See application file for complete search history.

(56) References Cited

U.S. PATENT DOCUMENTS 5,786,640 A * 7/1998 Sakai et al. ..................... 290/17
6,166,449 A  12/2000 Takaoka et al.
(Continued)

FOREIGN PATENT DOCUMENTS

| JP | 6-245321 A | 9/1994 |
|---|---|---|
| JP | 8-047109 A | 2/1996 |

(Continued)

OTHER PUBLICATIONS

International Search Report, dated Sep. 2, 2011, which issued during the prosecution of International Patent Application No. PCT/JP2011/063612, of which the present application is the national phase.

(Continued)

*Primary Examiner* — Justin Holmes
(74) *Attorney, Agent, or Firm* — Troutman Sanders LLP

(57) ABSTRACT

A power generation control device for an electric vehicle includes a power generator driven by an internal combustion engine, a drive battery that stores power generated by the power generator and sensing an SOC that is a state of charge, and a drive motor that propels a vehicle using power generated by the power generator or power stored in the drive battery. The power generation control device controls a power generation torque of the power generator to correspond to an output that is a sum of a drive request output calculated based on a manipulation separately from a drive torque of the drive motor and a battery request output calculated based on the SOC.

2 Claims, 6 Drawing Sheets

(56) References Cited

U.S. PATENT DOCUMENTS

| | | | |
|---|---|---|---|
| 6,480,767 B2* | 11/2002 | Yamaguchi et al. | 701/22 |
| 8,198,836 B2 | 6/2012 | Kachi et al. | |
| 2002/0107618 A1* | 8/2002 | Deguchi et al. | 701/22 |
| 2009/0115358 A1 | 5/2009 | Kachi et al. | |
| 2011/0231043 A1* | 9/2011 | Ebuchi et al. | 701/22 |
| 2011/0313602 A1* | 12/2011 | Hirata et al. | 701/22 |

FOREIGN PATENT DOCUMENTS

| | | |
|---|---|---|
| JP | 10-150701 A | 6/1998 |
| JP | 11-136808 A | 5/1999 |
| JP | 3200493 B2 | 8/2001 |
| JP | 2008-057383 A | 3/2008 |
| JP | 2009-113619 A | 5/2009 |
| JP | 2010-143310 A | 7/2010 |

OTHER PUBLICATIONS

International Preliminary Report on Patentability, dated Apr. 16, 2013, which issued during the prosecution of International Patent Application No. PCT/JP2011/063612, which corresponds to the present application.

* cited by examiner

POWER GENERATION CONTROL DEVICE FOR ELECTRIC VEHICLE

CROSS-REFERENCE TO RELATED APPLICATIONS

This is a U.S. national phase application under 35 U.S.C. §371 of International Patent Application No. PCT/JP2011/063612, filed on Jun. 14, 2011, and claims benefit of priority to Japanese Patent Application No. 2010-210969, filed Sep. 21, 2010. The International Application was published on Mar. 29, 2012, as International Publication No. WO 2012/039167 under PCT Article 21(2). The entire contents of these applications are hereby incorporated by reference.

TECHNICAL FIELD

The present invention relates to a power generation control device for an electric vehicle and, particularly to, a power generation control device for an electric vehicle performing power generation control of a power generator driven by an internal combustion engine installed in a series hybrid electric vehicle in consideration of a drive torque of the electric vehicle and an amount of charging a drive battery.

BACKGROUND ART

A series hybrid electric vehicle includes a power generator driven by an internal combustion engine, a drive battery capable of storing power generated by the power generator and sensing an SOC that is a state of charge, and a drive motor capable of propelling a vehicle using power generated by the power generator or power stored in the drive battery, and controls operation of the internal combustion engine and charge/discharge of the drive battery by a power generation control device.

Examples of the power generation control of the power generator driven by the internal combustion engine include a control of deciding the generated power on the basis of determination of a battery state and determining the battery state on the basis of the maximum regenerative electric power and the maximum generated power (Japanese Laid-open Patent Publication No. 1999-136808), a control of executing/stopping the power generation depending on an SOC that is a state of charge of the battery in which the power generation time varies depending on the vehicle speed (Japanese Patent No. 3200493), and a control of setting a target SOC from a travelling state and converging the SOC to the target SOC (Japanese Laid-open Patent Publication No. 1998-150701).

CITATION LIST

Patent Literature

Patent Literature 1: Japanese Laid-open Patent Publication No. 1999-136808
Patent Literature 2: Japanese Patent No. 3200493
Patent Literature 3: Japanese Laid-open Patent Publication No. 1998-150701

SUMMARY OF INVENTION

Technical Problem

Incidentally, types of the power generation control device for the electric vehicle include a type of intermittently operating the power generator at an operating point of the maximum power generation efficiency in order to keep the SOC in a fixed range (hereinafter, described as a "fixed point operation") and a type of controlling the drive motor and other electric loads so that the power consumption of the drive motor and the other electric loads coincides with the generated power.

However, the former that is the fixed point operation type is disadvantageous in that the driver gets a feeling of strangeness because the internal combustion engine is operated at a fixed number of rotations at all times irrespective of the will of the driver such as the accelerator operation. The latter that is the electric load control type is disadvantageous in that the travelling performance is restricted by the power generation capacity when the drive motor output is simply limited according to power imbalance because the power consumption is decided by the generated power.

An object of the present invention is to generate power without giving a feeling of strangeness while ensuring the travelling performance.

Solution to Problem

The present invention is a power generation control device for an electric vehicle, comprising: a power generator driven by an internal combustion engine; a drive battery capable of storing power generated by the power generator and sensing an SOC that is a state of charge; and a drive motor capable of propelling a vehicle using power generated by the power generator or power stored in the drive battery, wherein the power generation control device controls a power generation torque of the power generator to correspond to an output that is a sum of a drive request output calculated based on a manipulation separately from a drive torque of the drive motor and a battery request output calculated based on the SOC.

Advantageous Effects of Invention

The power generation control device for the electric vehicle of the present invention can ensure the drive force of the drive motor and the travelling performance that comply with the intention of the driver.

The power generation control device for the electric vehicle of the present invention can ensure the power generation amount of the power generator to charge the drive battery.

The power generation control device for the electric vehicle of the present invention can maintain the drive battery in a state close to a preferable SOC.

DESCRIPTION OF EMBODIMENTS

Hereinafter, an embodiment of the present invention will be described based on the drawings.

Figure 1:
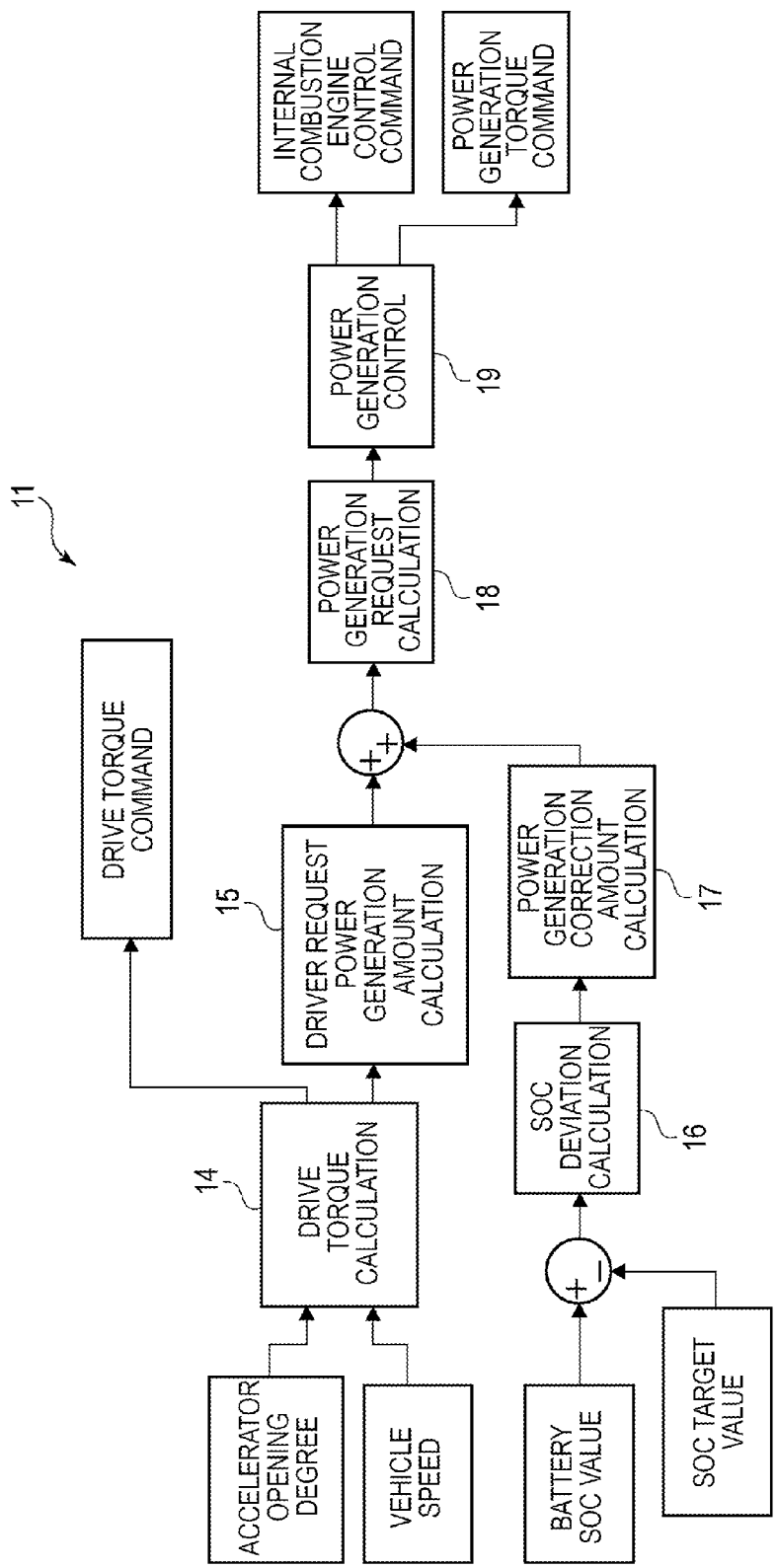
FIG. 1 is a block diagram of power generation control of a power generation control device for an electric vehicle. (Embodiment)
Figure 2:
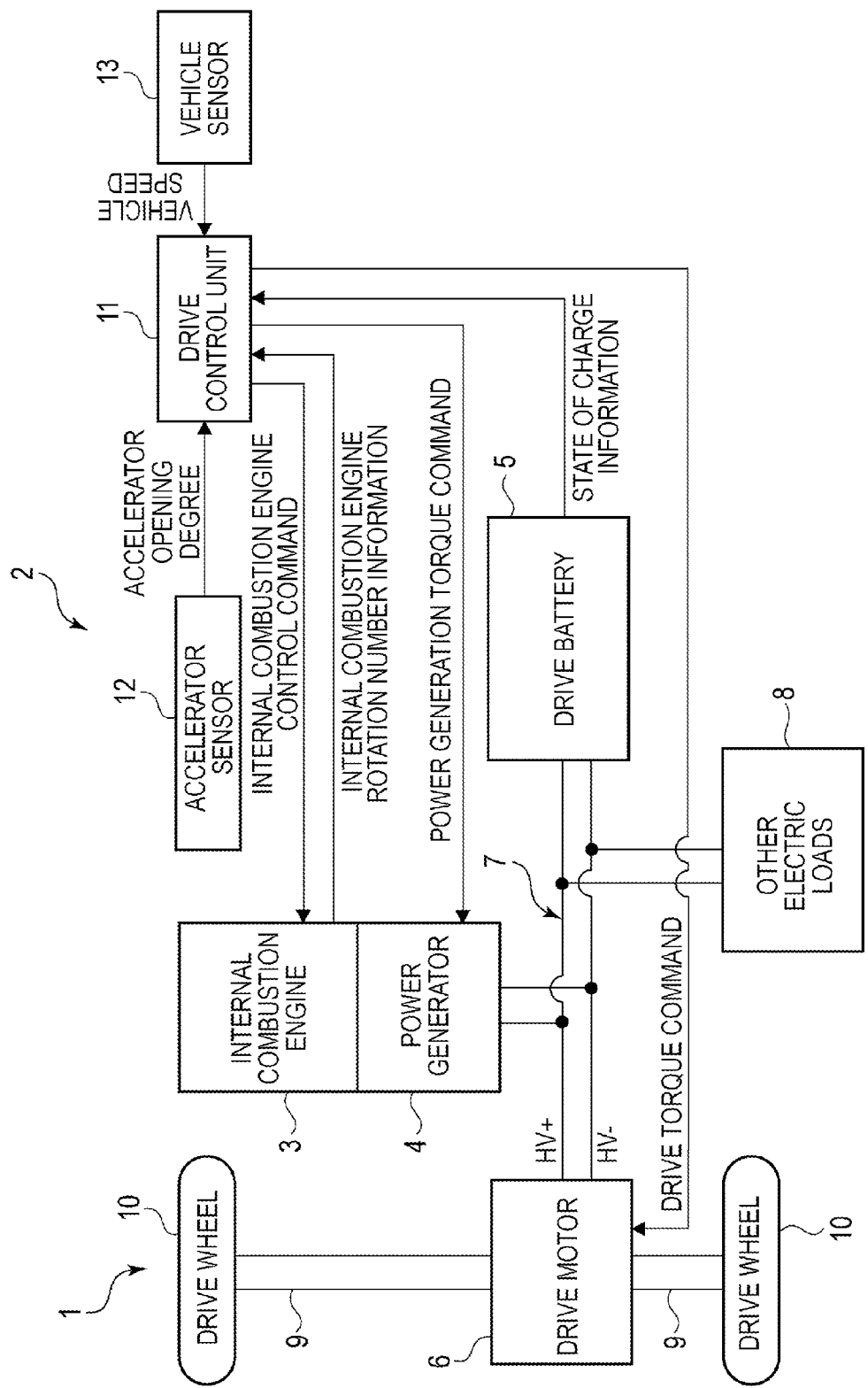
FIG. 2 is a system configuration diagram of the power generation control device for the electric vehicle. (Embodiment)

FIG. 1 to FIG. 6 illustrate the embodiment of the present invention. In FIG. 2, a numeral 1 denotes a series hybrid electric vehicle and a numeral 2 denotes a power generation control device. The power generation control device 2 for the electric vehicle 1 is configured such that a power generator 4 driven by an internal combustion engine 3, a drive battery 5, and a drive motor 6 are connected one another by a high-voltage cable (HV+/HV−) 7. To the high-voltage cable 7, other electric loads 8 are further connected. The other electric loads 8 are electric loads driven with high voltage, such as an A/C compressor, an air conditioning heater and the like.

The drive battery 5 is capable of storing power generated by the power generator 4 and sensing a state of charge (hereinafter, described as an "SOC"). The drive motor 6 is driven using the power generated by the power generator 4 or the power stored in the drive battery 5 and capable of propelling the vehicle by driving drive wheels 10 via drive shafts 9.

The internal combustion engine 3, the power generator 4, the drive battery 5, and the drive motor 6 are connected to a drive control unit 11 of the power generation control device 2. To the drive control unit 11, an accelerator sensor 12 that detects the accelerator opening degree and a vehicle speed sensor 13 that detects the vehicle speed are connected. Into the drive control unit 11, internal combustion engine rotation number information on the internal combustion engine 3, the SOC of the drive battery 5, an accelerator opening degree signal detected by the accelerator sensor 12, and a vehicle signal detected by the vehicle speed sensor 13 are inputted. The accelerator opening degree signal is a signal indicating the accelerator opening degree by an accelerator operation that is a manipulation by a driver. The vehicle signal is a signal indicating the vehicle speed of the electric vehicle 1.

The power generation control device 2 drives the drive motor 6 according to a drive torque command calculated by the drive control unit 11, and drives the drive wheels 10 via the drive shafts 9. The power generation control device 2 transmits, on the other hand, an internal combustion engine control command (for example, a throttle opening degree command) from the drive control unit 11 to the internal combustion engine 3 in order to generate power to be consumed by the drive motor 6 and the other electric loads 8 and transmits a power generation torque command to the power generator 4 to control the power generation amount so that the power consumption=the generated power, as a whole. However, the instantaneous value of the generated power does not always need to coincide with the power consumption because the drive battery 5 is used as a power buffer.

In the power generation control device 2, the drive control unit 11 decides the generated power as illustrated in FIG. 1. In the drive control unit 11, the drive torque command to the drive motor 6 required for travelling of the electric vehicle 1 is calculated from the accelerator opening degree and the vehicle speed by a drive torque calculation part (refer to explanation of later-described FIG. 3). In this event, to supply the power required for travelling, calculation of a driver request power generation amount (refer to explanation of later-described FIG. 4) is implemented by a driver request power generation amount calculation part 15, but the result of the calculation of the driver request power generation amount does not always need to coincide with the power consumed by the drive motor 6. Since the driver request power generation amount is intimately related to an internal combustion engine operating condition, the driver gets a feeling of strangeness if the internal combustion engine operating condition is different from that expected through the driving operation.

Hence, the drive control unit 11 decides the driver request power generation amount (drive request output) focused on preventing, as much as possible, the driver from getting the feeling of strangeness on the basis of the internal combustion engine operating condition mainly including the accelerator opening degree decided based on the manipulation. When power control is conducted according to the driver request power generation amount, the drive battery 5 comes into a current flow-in state or a current flow-out state and results in an overcharge or over-discharge state. Therefore, in the drive control unit 11, an SOC deviation being the difference between the SOC and an SOC target value that is a convergence target of the SOC is calculated by an SOC deviation calculation part 16, a power generation correction amount (battery request output) on the basis of the SOC deviation is calculated by a power generation correction amount calculation part 17 (refer to explanation of later-described FIG. 5), and the result of calculation of the power generation correction amount calculation part 17 is added to the aforementioned driver request power generation amount by a power generation request calculation part 18.

The SOC deviation between the SOC of the drive battery 5 and the SOC target value is fed back (likely to charge by power generation), whereby the SOC falls within a certain range. According to the power generation request being the sum of the driver request power generation amount and the power generation correction amount, power generation control (refer to explanation of later-described FIG. 6) is conducted in a power generation control part 19, so that the internal combustion engine control command to the internal combustion engine 3 and the power generation torque command to the power generator 4 are calculated. The drive control unit 11 transmits the internal combustion engine control command to the internal combustion engine 3 and transmits the power generation torque command to the power generator 4 to thereby control the power generation amount.

The manipulation of the driver here means an accelerator operation. Since the accelerator opening degree is decided according to the accelerator operation amount, the accelerator operation amount can be detected by detecting the accelerator opening degree by the accelerator sensor 12. Further, the battery request output calculated based on the SOC of the drive battery 5 is the power generation correction amount. A result obtained by adding the battery request output as the power generation correction amount to the power generation amount on the basis of the driver request power generation amount decided based on the manipulation (accelerator opening degree) is a final real power generation amount.

In this event, the driver request power generation amount and the real drive motor output are considered to be approximately equivalent in some cases but are not always instantaneously coincident with each other, and the charge/discharge amount of the drive battery 5 and the power generation correction amount are similarly considered to be approximately equivalent in some cases but are not always instantaneously coincident with each other.

The reason why there is no problem if income and outgo are accumulated as they are and the difference therebetween is accumulated is that the difference appears in the charge/discharge amount of the drive battery 5 and appears in the SOC deviation and the difference is therefore corrected as a result of the feedback of the SOC deviation. Accordingly, the income and the outgo coincide with each other, so that the power consumption=the generated power as a whole. Therefore, the battery request output can be the power generation correction amount.

Figure 3:
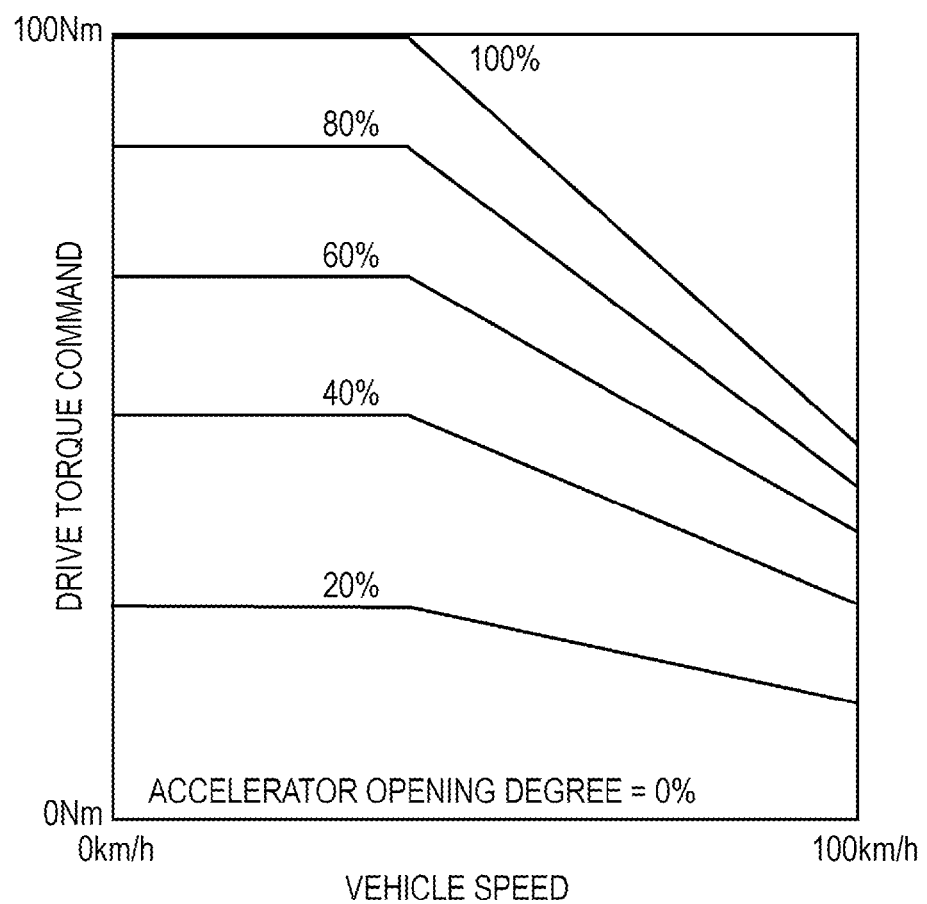
FIG. 3 is a diagram illustrating a first map of drive torque calculation. (Embodiment)

FIG. 3 is an example of a first map used for calculation of the drive torque by the drive torque calculation part 14. As illustrated in FIG. 3, the drive torque of the drive motor 6 is set based on the accelerator opening degree and the vehicle speed and using the first map. Specifically, the drive torque of the drive motor 6 is set so that the drive torque increases as the accelerator opening degree increases, and the drive torque gradually decreases as the vehicle speed increases on the high speed side of the vehicle speed.

In this case, the drive torque command is decided according to the vehicle speed and the accelerator opening degree. What is to be focused on is the fact that the decided drive torque command is not limited by the power generation amount or the power generation amount predicted value of the power generator 4 at that time. Even if a rising characteristic of the power generator 4 is low in responsiveness due to putting a high priority on the power generating efficiency, a drive torque characteristic can be set independently of the rising characteristic.

Figure 4:
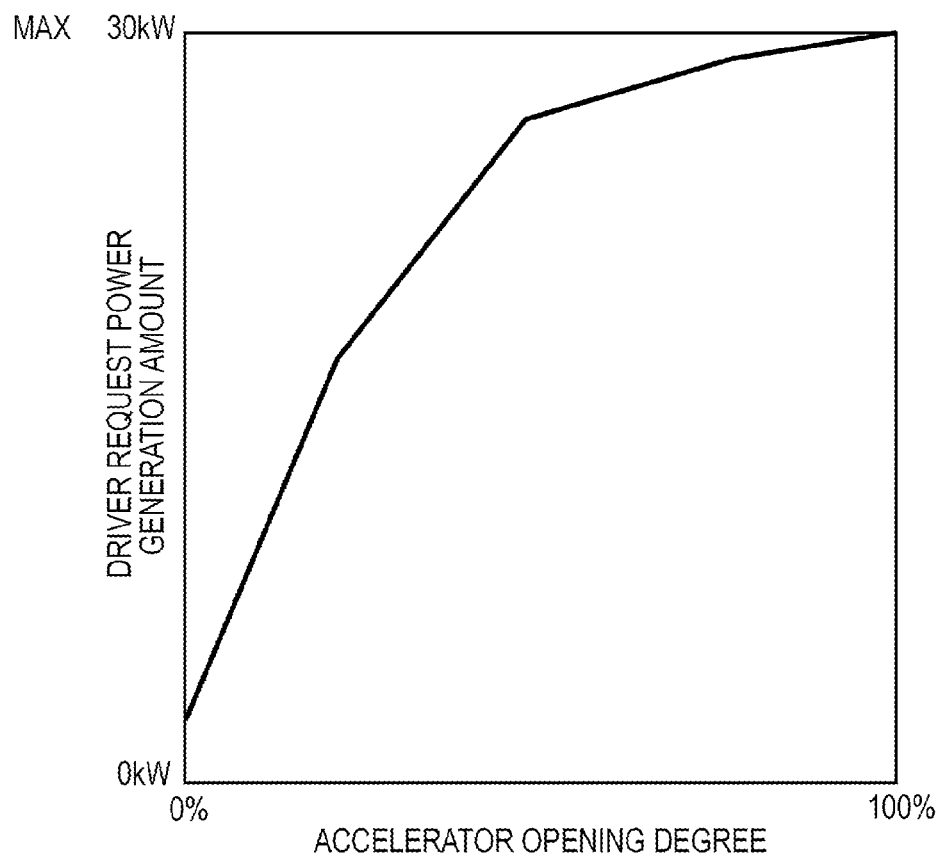
FIG. 4 is a diagram illustrating a second map of driver request power generation amount calculation. (Embodiment)

FIG. 4 is an example of a second map used for calculation of the driver request power generation amount by the driver request power generation amount calculation part 15. As illustrated in FIG. 4, the driver request power generation amount (drive request output) on the basis of the manipulation is set based only on the accelerator opening degree. Specifically, the driver request power generation amount is set so that the driver request power generation amount increases as the accelerator opening degree increases, and a rate of increase of the driver request power generation amount decreases as the accelerator opening degree increases.

The driver request power generation amount (drive request output) does not need to coincide with the power consumption of the drive motor 6 predicted from the drive torque command in FIG. 3, but is set based on the internal combustion engine operating condition expected by the driver through the driving operation. Generally, an increase in the internal combustion engine rotation number is expected by pressing the accelerator pedal. In this embodiment, the drive request power generation amount is set to simply increase with respect to the accelerator opening degree.

Figure 5:
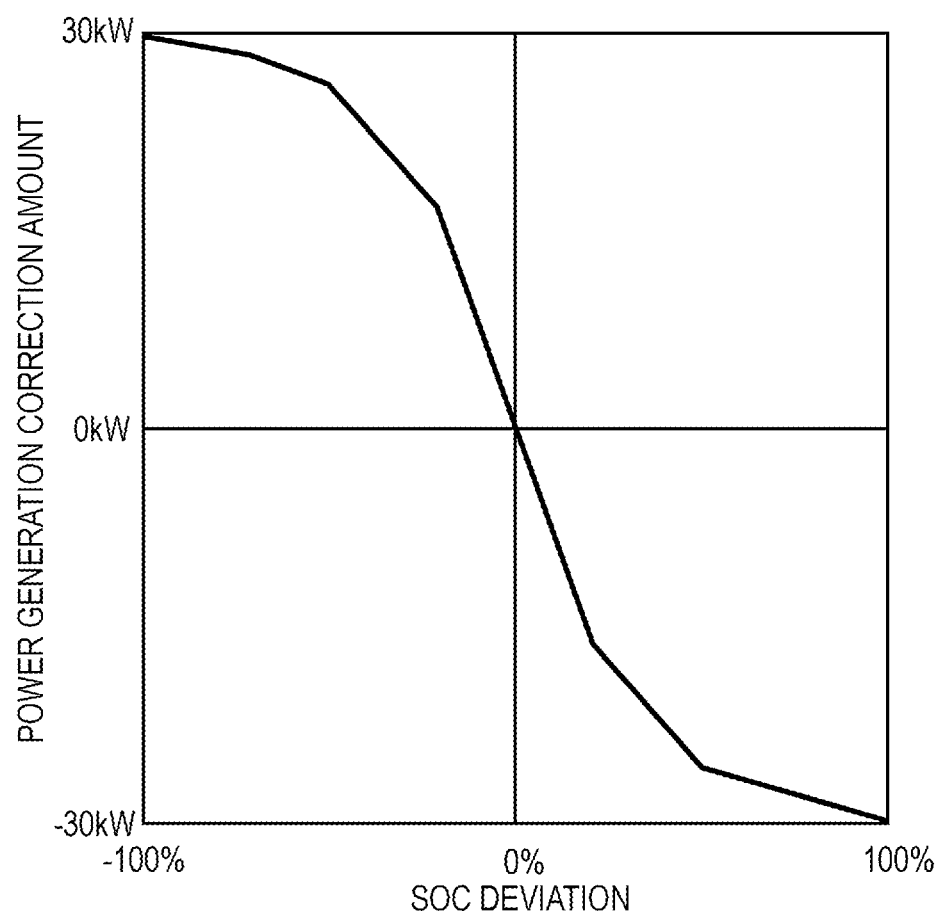
FIG. 5 is a diagram illustrating a third map of a power generation correction amount (battery request output). (Embodiment)

FIG. 5 is an example of a third map used for calculation of the power generation correction amount by the power generation correction amount calculation part 17. As illustrated in FIG. 5, the power generation correction amount (battery request output) is set based on the SOC deviation between the SOC of the drive battery 5 and the SOC target value. Specifically, an absolute value of the power generation correction amount increases as the SOC deviation increases, and a rate of increase of the absolute value of the power generation correction amount gradually decreases as the SOC deviation increases.

When the SOC deviation that is the difference between the SOC of the drive battery 5 and the SOC target value is positive, the power generation request is suppressed by setting the power generation correction amount to a negative value so as to decrease the SOC. When the SOC deviation is negative, the power generation request is increased by setting the power generation correction amount to a positive value so as to increase the SOC. Thus, the SOC of the drive battery 5 is controlled centering on the SOC target value. The power generation correction amount acts as a bias with respect to the aforementioned driver request power generation amount and therefore can minimize the feeling of strangeness of the internal combustion engine operating condition to the driver.

Figure 6:
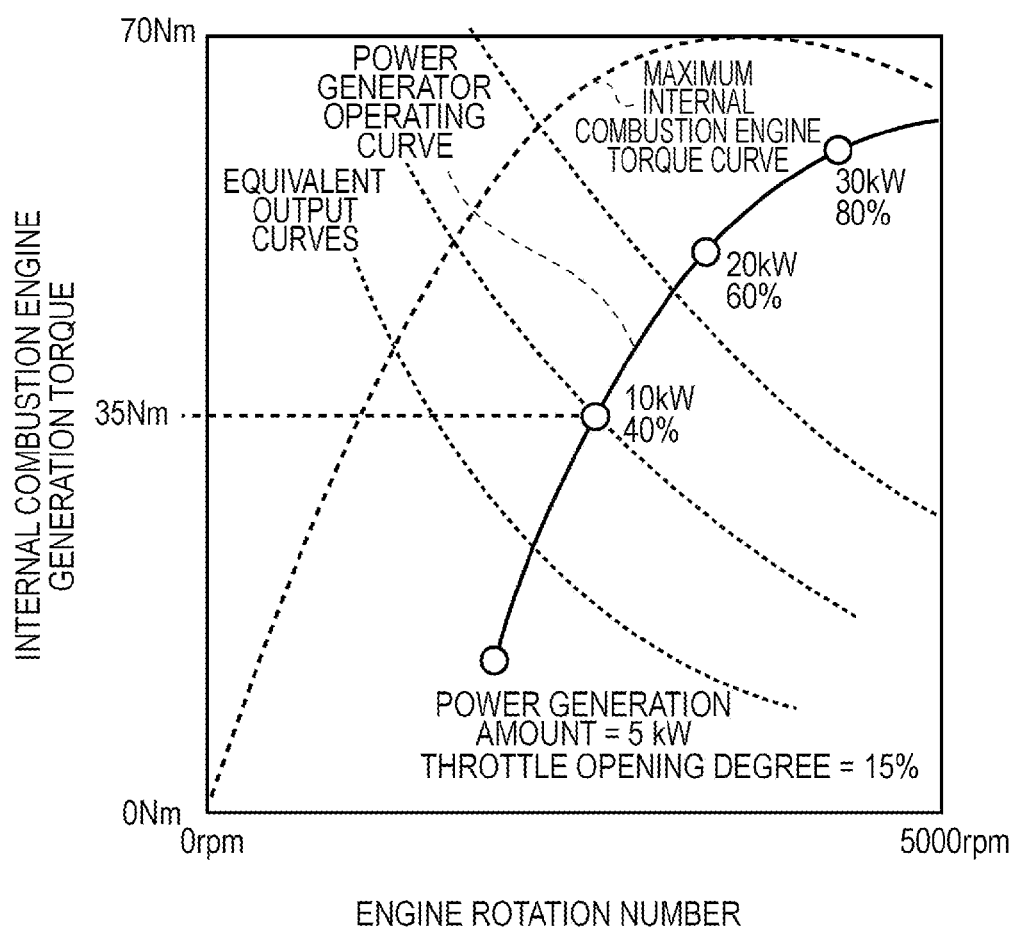
FIG. 6 is a diagram illustrating a maximum internal combustion engine torque curve and a power generator operating curve on an internal combustion engine characteristic map. (Embodiment)

FIG. 6 illustrates an internal combustion engine characteristic (maximum internal combustion engine torque curve) and a power generator operating curve for indicating an example of power generation control by the power generation control part 19. On the map of the internal combustion engine characteristic, equivalent output curves decided from the internal combustion engine rotation number and the internal combustion engine generation torque are drawn, and a curve linking points where the internal combustion engine efficiency is best on the equivalent output curves is decided as an operating curve of the power generator 4. The power generator operating point (internal combustion engine rotation number, internal combustion engine generation torque) on the operating curve is uniquely decided with respect to the aforementioned power generation request, and the internal combustion engine control request value (for example, a throttle opening degree) to the internal combustion engine 3 at that time can be found in advance from the characteristic of the internal combustion engine. For power generation control on a certain operating point, the internal combustion engine generation torque and the power generation torque need to be equal, so that where the power generation request is 10 kW, the power generation torque command=the internal combustion engine generation torque=35 Nm, and the throttle opening degree (internal combustion engine control command) =40% can be decided, for example, in FIG. 6.

The output control of the internal combustion engine 3 will be described. The power generation control device 2 that controls the output of the internal combustion engine 3 calculates the "driver request power generation amount," the "SOC (state of charge)" and a "request power for the target SOC." The "driver request power generation amount" is calculated by the accelerator operation that is the manipulation by the driver. The "drive torque" of the drive motor can be calculated by the vehicle speed and the accelerator operation that is the manipulation by the driver.

As the lower limit of the range allowed as a usual range of use of the drive battery 5, that is, the allowable lower limit value of the SOC, a set value a is set. When the SOC at the present time (calculation time) is the set value a or more, the SOC is determined to have a margin with respect to the allowable lower limit value. Since the usual range of use of the drive battery 5 is set to a range narrower than the usable range of the drive battery 5, the allowable lower limit value is a large value with a margin width as compared to the lower limit value of the usable range of the drive battery 5.

If the SOC at the present time is less than the set value a, the SOC cannot be decreased any further, and it is determined to need restoration of the state. Then, a ("driver request power generation amount"+"request power for the target SOC") is regarded as a "target output of the internal combustion engine" and the SOC is improved while the drive output on the basis of the manipulation is maintained. The operation (combustion) of the internal combustion engine 3 is in an enrich region.

In the operation (combustion) of the internal combustion engine 3, a threshold value b corresponding to the engine output corresponding to the boundary between a stoichiometric region and the enrich region is set. When the SOC at the present time is the set value a or more, the output of the internal combustion engine 3 for generating the ("driver request power generation amount"+"request power for the target SOC") is compared with the threshold value b.

When the output of the internal combustion engine 3 for generating the ("driver request power generation amount"+ "request power for the target SOC") is the threshold value b or less, the "target output of the internal combustion engine" is set to the ("driver request power generation amount"+"request power for the target SOC"). Thus, the SOC is improved while the drive output on the basis of the manipulation is maintained. The operation (combustion) of the internal combustion engine 3 is in the stoichiometric region.

When the output of the internal combustion engine 3 for generating the ("driver request power generation amount"+ "request power for the target SOC") exceeds the threshold value b, the "target output of the internal combustion engine" is set to the same value as the threshold value b. Thus, the drive output on the basis of the manipulation is preferentially ensured as much as possible, while the SOC is improved if there is a margin. At this time, the power generation corresponding to the SOC deviation is not charged as it is but suppressed. When the output of the internal combustion engine 3 required for generating only the "driver request power generation amount" exceeds the threshold value b, the drive torque of the electric vehicle 1 is limited so that the improvement of the SOC (charge to the drive battery 5) is not performed. Also at this time, the operation (combustion) of the internal combustion engine 3 is in the stoichiometric region.

As described above, the power generation control device 2 controls the power generation torque of the power generator 4 to correspond to the output that is the sum of the driver request power generation amount (drive request output) calculated based on the manipulation separately from the drive torque of the drive motor 6 and the power generation correction amount (battery request output) calculated based on the SOC of the drive battery 5.

Thus, the power generation control device 2 for the electric vehicle 1 can ensure the drive force of the drive motor 6 and the travelling performance that comply with the intention of the driver. Further, the power generation control device 2 can ensure the power generation amount of the power generator 4 to charge the drive battery 5. Further, the power generation control device 2 can maintain the drive battery 5 in a state close to a preferable SOC.

Further, the power generation control device 2 sets in advance the SOC target value that is the convergence target of the SOC of the drive battery 5, and calculates the power generation correction amount (battery request output) on the basis of the deviation between the SOC of the drive battery 5 and the SOC target value.

Thus, the power generation control device 2 for the electric vehicle 1 increases and decreases the power generation amount of the power generator 4 to converge the SOC of the drive battery 5 to a desired SOC target value so that the charge/discharge accompanying that is performed to thereby converge the actual SOC of the drive battery 5 to the desired SOC target value. In other words, the power generation control device 2 can perform feedback control about the charge/discharge of the drive battery 5.

Furthermore, the drive torque applied to the drive motor 6 by the power generation control device 2 corresponds to the driver request power generation amount (drive request output) on the basis of the manipulation and does not depend on the power generation torque of the power generator 4 around the same time.

Thus, the power generation control device 2 for the electric vehicle 1 can ensure the sufficient drive force and the high travelling performance that comply with the intention of the driver.

Further, the power generation control device 2 sets the drive torque of the drive motor 6, based on the accelerator opening degree and the vehicle speed and using the first map (FIG. 3) in which the drive torque increases as the accelerator opening degree increases and the drive torque gradually decreases as the vehicle speed increases on the high speed side. Further, the power generation control device 2 sets the driver request power generation amount (drive request output) on the basis of the manipulation, based only on the accelerator opening degree and using the second map (FIG. 4) in which the driver request power generation amount (drive request output) increases as the accelerator opening degree increases and the rate of increase of the driver request power generation amount (drive request output) decreases as the accelerator opening degree increases. Further, the power generation control device 2 sets the power generation correction amount (battery request output), based on the SOC deviation between the SOC of the drive battery and the SOC target value and using the third map (FIG. 5) in which the absolute value of the battery request output that is the power generation correction amount increases as the SOC deviation increases and the rate of increase of the absolute value of the battery request output that is the power generation correction amount gradually decreases as the SOC deviation increases.

Thus, the power generation control device 2 for the electric vehicle 1 can sufficiently generate power while ensuring the travelling performance that complies with the intention of the driver without giving the feeling of strangeness. Further, the power generation control device 2 for the electric vehicle 1 can converge the actual SOC of the drive battery 5 to a value close to a desired SOC target value and maintain the SOC while ensuring the travelling performance.

INDUSTRIAL APPLICABILITY

A power generation control device for an electric vehicle according to the present invention is applicable not only to a series hybrid electric vehicle but also to a series-parallel hybrid electric vehicle.

The invention claimed is:

1. A power generation control device for an electric vehicle, comprising:
   a power generator driven by an internal combustion engine;
   a drive battery capable of storing power generated by the power generator and sensing an SOC that is a state of charge; and
   a drive motor capable of propelling a vehicle using power generated by the power generator or power stored in the drive battery,
   wherein the power generation control device sets in advance an SOC target value that is a convergence target of the SOC of the drive battery, and controls a power generation torque of the power generator to correspond to an output that is a sum of a drive request output calculated based on a manipulation separately from a drive torque of the drive motor and a battery request output calculated based on a deviation between the SOC of the drive battery and the SOC target value.

2. The power generation control device for an electric vehicle according to claim 1, wherein the power generation control device sets the drive torque of the drive motor, based on an accelerator opening degree and a vehicle speed and using a first map in which the drive torque increases as the accelerator opening degree increases and the drive torque gradually decreases as the vehicle speed increases on a high speed side of the vehicle speed, sets the drive request output on the basis of the manipulation, based only on the accelerator opening degree and using a second map in which the drive request output increases as the accelerator opening degree increases and a rate of increase of the drive request output decreases as the accelerator opening degree increases, and sets the battery request output, based on a deviation between the SOC of the drive battery and an SOC target value and using a third map in which an absolute value of the battery request output that is a power generation correction amount increases as the deviation increases and a rate of increase of the absolute value of the battery request output that is the power generation correction amount gradually decreases as the deviation increases.

* * * * *